(12) United States Patent
Snider et al.

(10) Patent No.: US 6,351,687 B1
(45) Date of Patent: Feb. 26, 2002

(54) FERTILIZER DISPENSING METHOD

(75) Inventors: Douglas Snider; William Robb, both of Tisdale (CA)

(73) Assignee: Northern Steel Industries, Tisdale (CA)

( * ) Notice: Subject to any disclaimer, the term of this patent is extended or adjusted under 35 U.S.C. 154(b) by 0 days.

(21) Appl. No.: 09/476,827

(22) Filed: Jan. 3, 2000

(30) Foreign Application Priority Data

May 19, 1999 (CA) .............................................. 2272444

(51) Int. Cl.$^7$ ............................................... G06F 17/00
(52) U.S. Cl. ....................... 700/239; 700/239; 700/241; 700/265; 141/104; 141/105; 222/14; 222/136; 137/606
(58) Field of Search ................................. 700/237, 232, 700/233, 236, 239, 240, 241, 242, 265, 285; 222/14, 136; 141/100, 104, 105, 106, 107; 137/606, 101.21

(56) References Cited

U.S. PATENT DOCUMENTS

| | | | |
|---|---|---|---|
| 3,959,636 A | * | 5/1976 | Johnson et al. ........ 235/151.33 |
| 4,527,245 A | | 7/1985 | Axelson, Jr. et al. |
| 4,719,574 A | * | 1/1988 | Duback et al. ............. 364/468 |
| 5,154,314 A | * | 10/1992 | Van Wormer ................... 222/1 |
| 5,967,202 A | * | 10/1999 | Mullen et al. ............... 141/104 |

* cited by examiner

Primary Examiner—Christopher P. Ellis
Assistant Examiner—Khoi H. Tran
(74) Attorney, Agent, or Firm—Oppenheimer Wolff & Donnelly LLP (57) ABSTRACT

A method for dispensing blended fertilizer to a customer at a dispensing site, which may be remote and unmanned. The fertilizer dealer enters the blend of standard fertilizer ingredients required to provide the customer's desired nutrients into a database identified with the customer. The customer identifies himself to a dispensing site based computer which recognizes the blend and operates a blending and dispensing apparatus to dispense the desired quantity of blended fertilizer to the customer. A plurality of blends may be available to the customer.

13 Claims, 4 Drawing Sheets

FERTILIZER DISPENSING METHOD

The invention deals with the field of fertilizer handling and in particular with systems for distributing and dispensing fertilizer.

BACKGROUND

Demand for fertilizer is seasonal as the majority of fertilizer is applied at seeding or immediately before, usually over the course of four to six weeks out of a year. This very intense but short demand is difficult for fertilizer distributors to economically manage since it requires high labour input for a short period of time. It is difficult to find workers, as in farming areas there is a high labour demand at that time of year from everyone in agriculture.

Demand is increasing for blended fertilizers as more farmers soil test to determine what combination of nutrients is right for a particular field. They need to obtain the proper blend of different fertilizers so that the particular nutrients may be applied. Today's farmers therefore need more different blends and correspondingly smaller quantities of each blend. This makes on farm storage difficult with the result that more fertilizer is picked up by farmers as they apply it, further increasing the peak demand.

With consolidation of all kinds of rural services, including fertilizer dealers, in the larger towns, there are increased distances to the farms where the fertilizer is required. This puts a stress on the farmers' resources as well since more time and expense is involved in going to pick up the required fertilizer at a time when labour is usually already stretched to its limits.

Granular standard fertilizers are manufactured in more or less standard nutrient amounts and delivered to fertilizer dealers. The amount of a given nutrient in a standard fertilizer is designated by a number indicating the percentage of nutrient contained. The numbers are standardized, in Western Canada at least, such that the percentage of nitrogen is first, then phosphorus, then potassium and then sulfur.

For example a standard phosphate fertilizer may have an analysis of 11-52-0 meaning in 100 pounds of product there will be 11 pounds of nitrogen, 52 pounds of phosphorus and no potassium or sulfur. A standard nitrogen fertilizer may have an analysis of 46-0-0 meaning in 100 pounds of product there will be 46 pounds of nitrogen, no phosphorus, no potassium and no sulfur. A standard potassium fertilizer may have an analysis of 0-0-60 meaning in 100 pounds of product there will be no nitrogen, no phosphorus, 60 pounds of potassium and no sulfur. A standard sulphur fertilizer may have an analysis of 21-0-0-24 meaning in 100 pounds of product there will be 21 pounds of nitrogen, no phosphorus, no potassium and 24 pounds of sulfur.

The standard fertilizers are blended proportionately so that a farmer can apply, for example, 10 pounds of nitrogen, 10 pounds of phosphorous, 10 pounds of potassium and 5 pounds of sulfur on a field.

To calculate the blend, we start with the following required ingredients:

We need 19.23 pounds/acre of 11-52-0 to apply 10 pounds/acre of phosphorus (19.23×52%)

We need 16.67 pounds/acre of 0-0-60 to apply 10 pounds/acre of potassium (16.67×60%)

We need 20.83 pounds/acre of 21-0-0-24 to apply 5 pounds/acre of sulfur (20.83×24%)

Applying the above will, because of the nitrogen present in the 11-52-0 and 21-0-0-24 standard fertilizers, result in the application of the following nutrients per acre:

|  |  | N | P | K | S |
|---|---|---|---|---|---|
| 11-52-0 | 19.23 pounds | 2.16 | 10 | 0 | 0 |
| 0-0-60 | 16.67 pounds | 0 | 0 | 10 | 0 |
| 21-0-0-24 | 20.83 pounds | 4.37 | 0 | 0 | 5 |
|  | 56.73 pounds | 6.53 | 10 | 10 | 5 |

The nitrogen amount is short 3.47 pounds, so the single nutrient standard fertilizer 46-0-0 must be added to make up the shortage:

| 46-0-0 | 7.54 pounds | 3.47 | 0 | 0 | 0 |
|---|---|---|---|---|---|
|  | 64.27 pounds | 10 | 10 | 10 | 5 |

The proportions of each standard fertilizer in the blend is then as follows:

| 11-52-0 | 29.9% | (19.23/64.27) |
|---|---|---|
| 0-0-60 | 25.9% | (16.67/64.27) |
| 21-0-0-24 | 32.3% | (20.83/64.27) |
| 46-0-0 | 11.9% | (7.54/64.27) |
|  | 100% |  |

The blended fertilizer is identified by the identification number 15.55-15.55-15.55-7.75 which, when applied at 64.27 pounds/acre, will give the desired 10 pounds of nitrogen, 10 pounds of phosphorous, 10 pounds of potassium and 5 pounds of sulfur per acre.

Other standard fertilizers may contain other nutrients, and so the blending calculation can become quite complex. Computers are commonly used to calculate the blended fertilizer and application rate thereof that is required to apply a given amount of each nutrient and the proper proportions of standard fertilizers needed to achieve the blend.

For granular fertilizer, the correct individual amounts can be placed in a weighing batch blender, such as a rotating drum blender, where they are mixed into a substantially homogeneous blend. The weighing batch blender indicates the weight of fertilizer in the blender so that the operator can put in the proper amount of each standard fertilizer.

Alternatively the granular fertilizer can be continuously blended by adding the correct proportional amounts to a mixing conveyor, such as an auger, carrying the fertilizer to the customer's truck. A system for continuous blending is disclosed in U.S. Pat. No. 4,527,245 to Axelson, Jr. et al.

The benefits of liquid fertilizer are becoming more accepted and recognized by farmers, with the resulting increase in demand. Liquid standard fertilizers similarly are manufactured in standard nutrient amounts and delivered to dealers. For example a liquid phosphate fertilizer will have an analysis of 10-34-0 meaning in 100 pounds of product there will be 10 pounds of nitrogen, 34 pounds of phosphorus and no potassium. A liquid nitrogen fertilizer will have an analysis of 28-0-0 meaning in 100 pounds of product there will be 28 pounds of nitrogen, no phosphorus and no potassium. Liquid fertilizer is easily blended by simply adding the correct individual amounts to a tank where the liquid will essentially mix itself.

Liquid blended fertilizer is identified in the same way as granular blended fertilizer, with the percentage of each nutrient given in the same order as for granular.

As can be seen from comparing the nutrients in liquid and granular fertilizer, the liquid requires substantially higher quantities of material to be moved for the same amount of nutrients. For a busy farmer, hauling these larger quantities of liquid fertilizer long distances can be a real problem.

Satellite fertilizer distribution sites could be located in areas remote from the main dealer and convenient to the farmer consumers, however the expense of manning the sites is prohibitive. The operator of a present fertilizer blending plant must be skilled in calculation of blends, or at least in operating a computer to calculate same, as well as in operating the equipment required to blend and load the fertilizer. Un-skilled labour is therefore not a feasible option, as a miscalculation can result in application of the wrong nutrients and costly crop losses. As well, farmers expect to be able to pick up fertilizer from early morning to late at night, which could require two shifts of labour to cover the desired operating hours at the site.

SUMMARY OF THE INVENTION

It is an object of the present invention to provide a system and method for dispensing blended fertilizer that reduces the chances for errors in blending by the person dispensing the fertilizer.

It is a further object of the present invention to provide such a system and method that may be used at an unmanned dispensing site remote from the dealer site.

The invention accomplishes these objects providing in one aspect a method of dispensing blended fertilizer to a customer at a dispensing site, said blended fertilizer blended from a plurality of standard fertilizer ingredients by a blending and dispensing apparatus, said method comprising the following steps: entering the blend of standard fertilizer ingredients required to provide said customer's desired nutrients into a database identified with said customer, wherein said database is readable by a dispensing site based computer; providing an identifier to a customer, said identifier recognizable by said site based computer; presenting said identifier to said site based computer and entering into said site based computer the desired quantity of blended fertilizer to be dispensed; said site based computer then operating said blending and dispensing apparatus to dispense the desired quantity of blended fertilizer to the customer in accordance with said customer's desired fertilizer blend stored in the database.

The dispensing site could be remote from the dealer location allowing the customer around the clock access to blended fertilizer. The dealer and customer determine the amount of each nutrient required per acre for a given field and the dealer uses existing software, such as TRONIA™, to determine the blend required.

The blend is entered on the database and identified as one of the blended fertilizers available to the customer. There will likely be two or more blended fertilizers associated with each customer, and each blend will be entered into the database identified with that customer.

The customer, when attending the site to pick up fertilizer, will present his identifier, conveniently a coded card, to the site based computer. The customer will then be presented with a choice, on a small screen or the like, of the blended fertilizers available to him, and he will select, by pressing a numbered button or the like, the blended fertilizer that he wants to get and also will select the quantity to be dispensed. This method will reduce the possibility of choosing the wrong blend, as only pre-selected blends are available. The method allows for operation of a remote unmanned site. The customer would have only a few choices which could be identified with certain fields.

Alternatively the system could operate so that only one blended fertilizer could be available at any one time, so that the farmer would call the dealer and tell him which blended fertilizer was to be available. The dealer would then alter the database to make the requested blend available. This might be preferred where un-skilled or un-informed labour is employed to pick up the blended fertilizer, as only the quantity would be selected, with the farmer, through the dealer, selecting the blend.

It is also possible to allow the customer access to the system to create his own blends at the dispensing site, however it is contemplated that only rarely would this be advisable as the possibilities for error are substantial.

The site based computer will then dispense the proper blended fertilizer by controlling the operation of the blending and dispensing apparatus, which could be any known system. The method could be used for liquid or granular fertilizer.

In a second aspect the invention provides a method of dispensing liquid blended fertilizer to a customer's tank at a dispensing site, said liquid blended fertilizer dispensed from a plurality of standard fertilizer ingredients by a dispensing apparatus, said method comprising the following steps: entering the blend of standard liquid fertilizer ingredients required to provide said customer's desired blended fertilizer into a database identified with said customer, wherein said database is readable by a dispensing site based computer; providing an identifier to a customer, said identifier recognizable by said site based computer; presenting said identifier to said site based computer and entering into said site based computer the desired quantity of blended liquid fertilizer to be dispensed; said site based computer then calculating the quantity of each liquid standard fertilizer ingredient required in the selected quantity of blended liquid fertilizer and then operating said dispensing apparatus to dispense the required amount of each liquid standard fertilizer ingredient into said tank one ingredient at a time.

Liquid fertilizer may be blended in the customers tank by adding the standard fertilizer ingredients one at a time, thus simplifying the required apparatus, as the dispensing and blending apparatus may become simply a dispensing apparatus, which could comprise a pump, a valve and a meter which would indicate to the site based computer the quantity of each liquid standard fertilizer ingredient dispensed.

In a third aspect the invention provides an apparatus for dispensing granular blended fertilizer to a customer at a dispensing site, said blended fertilizer blended from a plurality of granular standard fertilizer ingredients, said system comprising a customer identifier; a site based computer operatively connected to a database containing at least one fertilizer blend identified with said customer, said site based computer programmed to identify said customer and said blend when presented with said customer identifier and to calculate the weight of each standard fertilizer required for the amount of blended fertilizer entered by said customer; a weighing batch blender operatively connected to said site based computer such that the weight of fertilizer in said weighing batch blender may be read by said site based computer; means to dispense said blended fertilizer to said customer from said weighing batch blender, said means to dispense operatively connected to said site based computer; means to selectively convey said standard fertilizer ingredients to said weighing batch blender one at a time, said means to selectively convey operatively connected to said site based computer; said site based computer programmed to convey the correct individual weight of each standard fertilizer to said weighing batch blender, to then operate said blender for a suitable time to blend said standard fertilizers into said blended fertilizer and to then operate said means to dispense said blended fertilizer to said customer and then to store the quantity of blended fertilizer dispensed to said customer in said database.

The means to dispense the blended fertilizer to the customer could convenveniently comprise a dispensing conveyor. The means to selectively convey standard fertilizer ingredients to the weighing batch blender one at a time could conveniently comprise a plurality of transfer conveyors, each transfer conveyor operatively connected to a storage container containing a quantity of one granular standard fertilizer ingredient, each transfer conveyor operative to convey one of the granular standard fertilizer ingredients to the batch blender when activated by said site based computer.

The apparatus could be operated by an unskilled worker or by the customer himself at an unmanned site. The available blends are limited to those entered into the database by the dealer.

A dealer computer could be linked to the site based computer such that the database may be revised by instructions received from the dealer computer and such that the quantity of fertilizer dispensed to a selected customer may be transmitted to the dealer computer.

The method or apparatus could be set up so that the customer must activate a dead-man switch before the site based computer will operate the apparatus to dispense blended fertilizer. At an unmanned site, this would be a desirable safety feature.

The database could store the quantity of blended fertilizer delivered to a customer which information could be used for billing or other purposes. When dispensing is complete, the site based computer could print a report of the quantity and blend of fertilizer dispensed for the customer's records. Conveniently the quantity of blended fertilizer to be applied per acre could be printed on the report for the customer's reference, as could any other related information.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Conventionally, a fertilizer dealer, in consultation with his customer, determines the nutrients the customer will apply to a field and, using conventional software or manual calculations, calculates the blend required to supply the desired nutrients.

Figure 1:
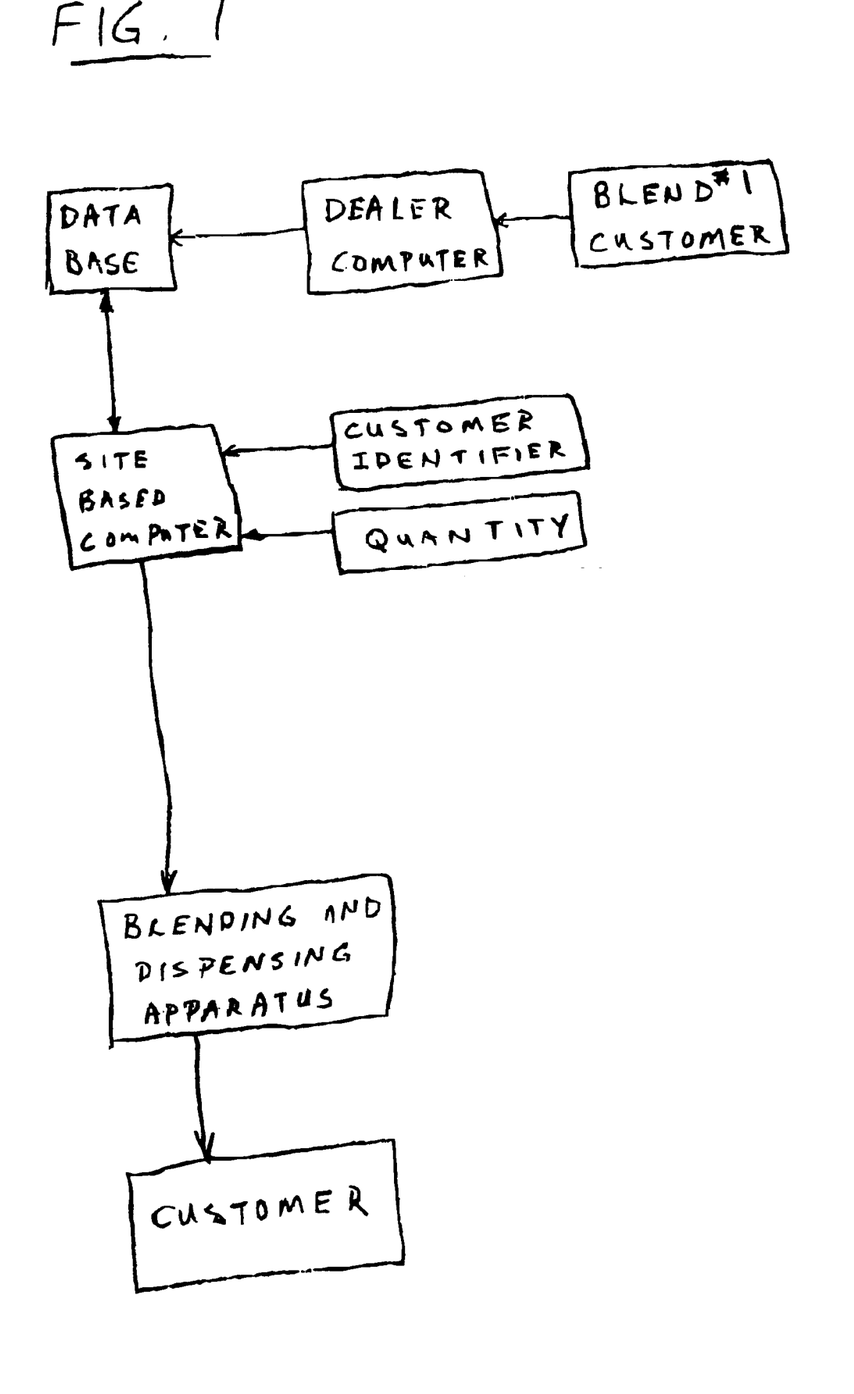
FIG. 1 is a flow chart of a method of the invention.

FIG. 1 shows a flow chart of the steps of the method of dispensing this desired blended fertilizer to a customer at a dispensing site, which may be remote from the dealers location.

The blend is entered through a dealer computer into a database identified with the customer, the database being readable by a dispensing site based computer. The customer is provided with an identifier, conveniently a coded card, which is recognizable by the site based computer. The identifier could also be a number which the customer simply enters into the site based computer, or could be any known means for identifying the customer. The customer presents the identifier to the site based computer and enters the desired quantity of blended fertilizer to be dispensed.

The site based computer then operates the blending and dispensing apparatus to dispense the desired quantity of blended fertilizer to the customer in accordance with the customer's desired fertilizer blend stored in the database. As a safety feature, an optional intervening dead man switch is included in the flow-chart of FIG. 2, which must be constantly activated by the customer in order for the blending and dispensing apparatus to operate.

Figure 2:
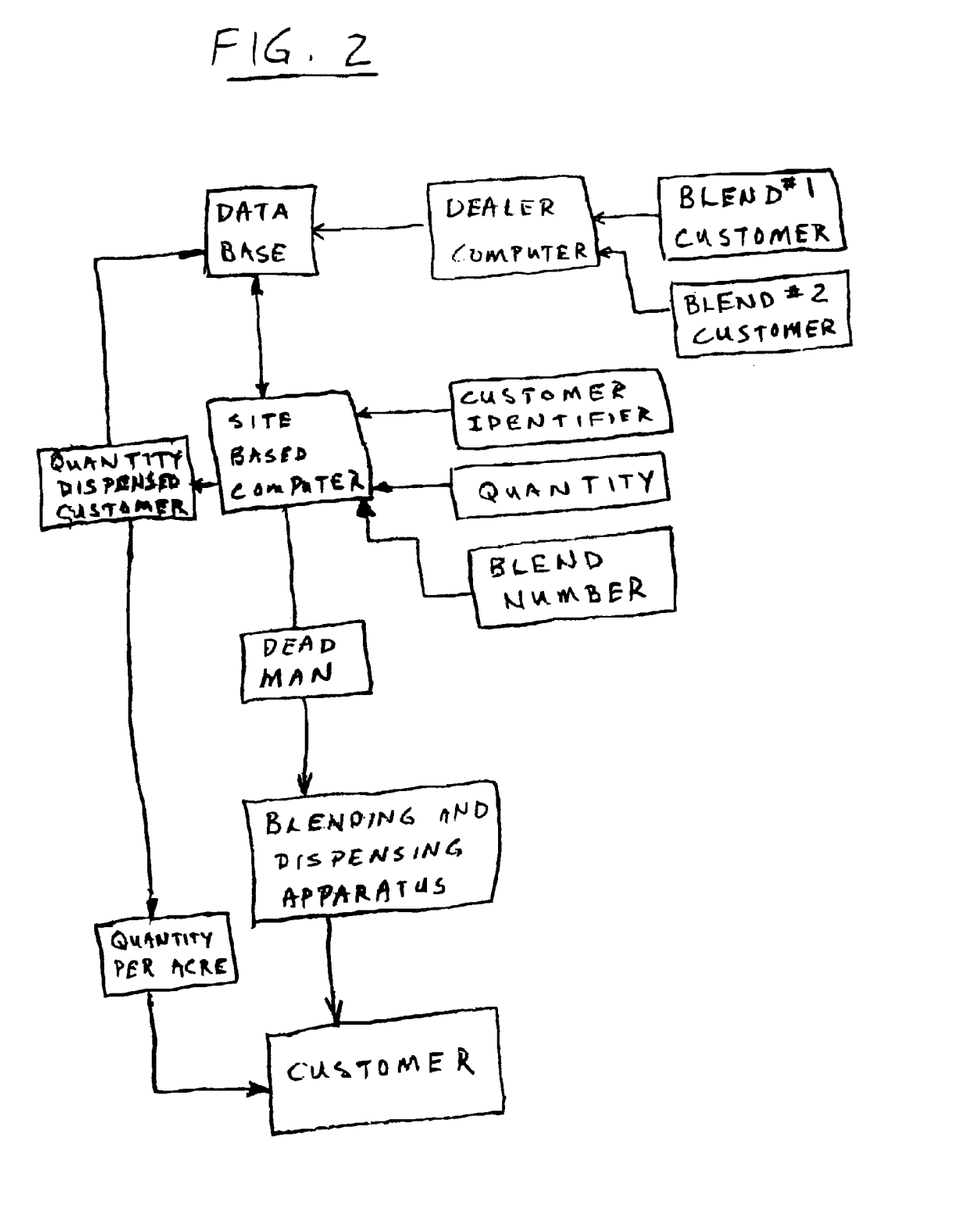
FIG. 2 is a flow chart of an alternate method of the invention.

Optionally as well, as illustrated in FIG. 2, the customer could require two or more different blends. The flow chart shows two blends which are entered into the database and identified with the customer. If there is a plurality of blends, then the customer will enter the number of the blend as well as the quantity when picking up fertilizer, as illustrated.

In the flow chart of FIG. 2, the site based computer stores the quantity of blended fertilizer delivered to a customer in the database, and also prints a report of the quantity and blend of fertilizer dispensed. As a convenience to the customer, the quantity of blended fertilizer to be applied per acre is also printed on the report.

Figure 3:
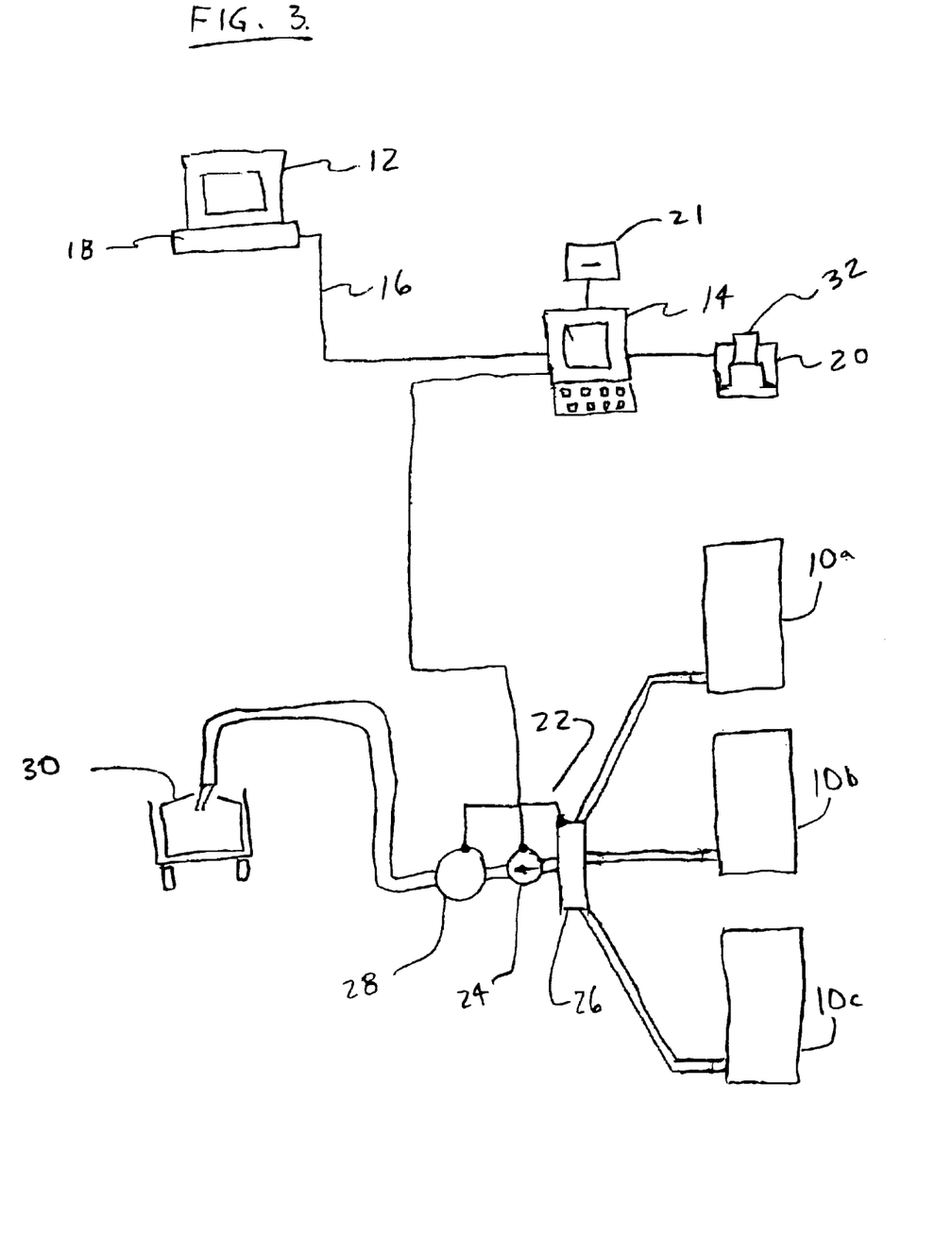
FIG. 3 is a schematic diagram of a system for use with liquid fertilizer.

FIG. 3 shows a schematic diagram of the system of one preferred embodiment of the method of dispensing liquid blended fertilizer to a customer at a dispensing site. The liquid blended fertilizer is made up of proportionate amounts of one or more liquid standard fertilizer ingredients that are stored at the dispensing site in individual containers 10a, 10b and 10c.

The system comprises a dealer computer 12 located at the dealer site, which includes a database 18. A site based computer 14 is located at the dispensing site, which may be remote from the dealer site. The illustrated system shows the dealer computer and site based computer in communication through communication line 16, however all that is required is a database 18 that can be accessed by the site based computer 14, which database 18 contains the information needed. The information can be entered directly into a database 18 in the site based computer 14. A printer 20 and a coded card reader 21 are also connected to the site based computer 14.

As liquid fertilizer requires no separate blending, a simple dispensing apparatus 22 is operatively connected to the site based computer 14. The dispensing apparatus 22 comprises a pump 24, a distributing valve 26, and a meter 28. The site based computer 14 is programmed to control the dispensing apparatus 22. When the customer enters the desired quantity of the required blend through the keyboard, the site based computer calculates how much of each individual ingredient is required, and operates the pump 24 and valve 26 to dispense the proper amount, as indicated by the meter 28, of each ingredient in turn into the customer's tank 30, where it becomes blended by agitation of the following ingredient, and by agitation of transport to the field. When dispensing is complete, the site based computer 14 prints a report 32 containing the blend and quantity dispensed, and the application rate in pounds/acre, for the customer. The blend and quantity dispensed and the customer receiving it is stored in the database 18 for future reference or billing.

Figure 4:
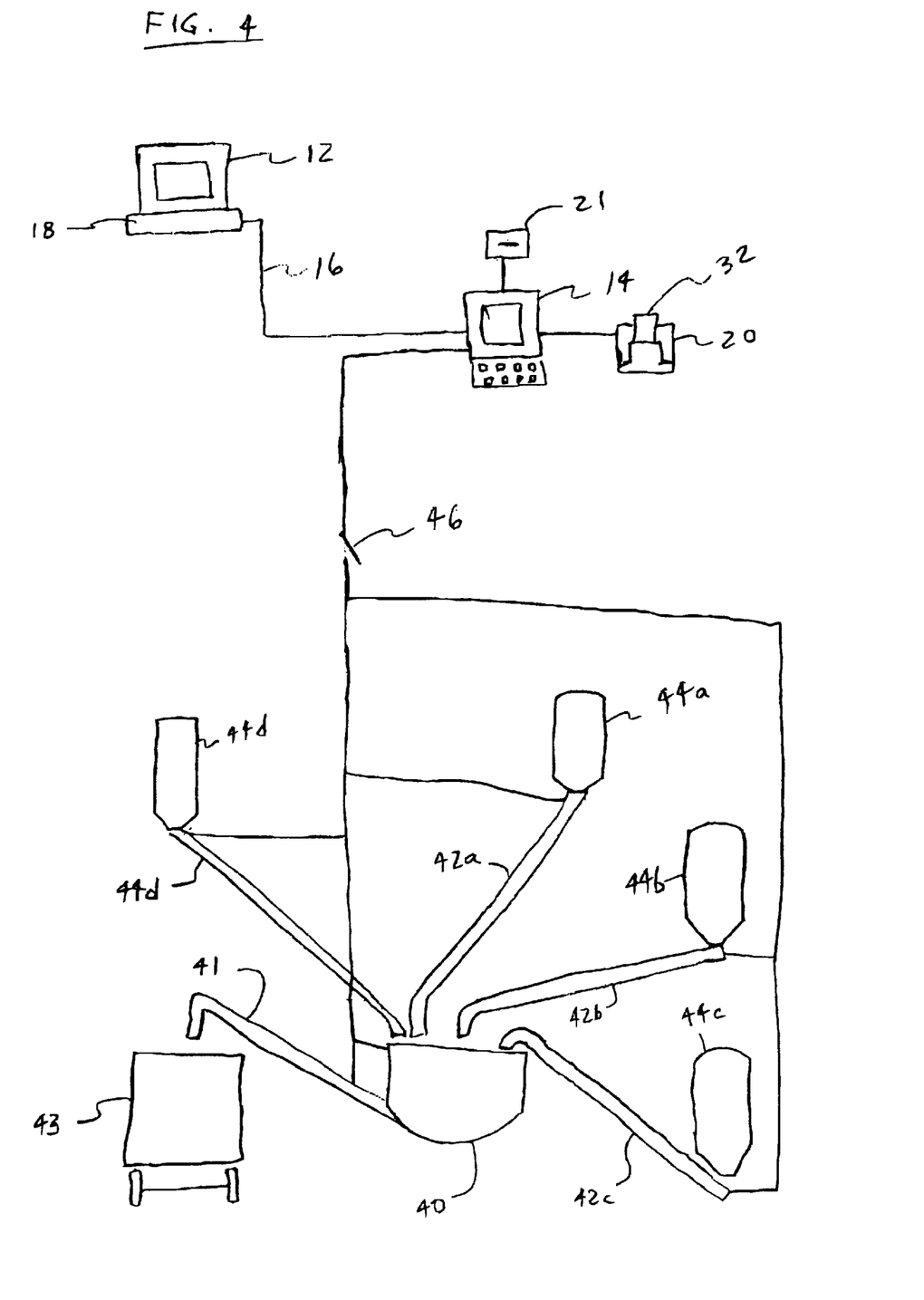
FIG. 4 is a schematic diagram of an apparatus for use with granular fertilizer.

FIG. 4 illustrates an apparatus for dispensing granular blended fertilizer. The apparatus comprises a site based computer 14 operatively connected to a database 18 containing at least one fertilizer blend identified with the customer.

A weighing batch blender 40 is connected to the site based computer 14 so that the weight of fertilizer in the weighing batch blender 14 may be read by the site based computer 14. A dispensing conveyor 41 is connected to the site based computer 14 to dispense the blended fertilizer to the customer's truck 43 from the weighing batch blender 14 when operated by the site based computer 14.

Transfer conveyors 42a, 42b, 42c and 42d are each operative to transfer one of the standard fertilizer ingredients from the storage bins 44a, 44b, 44c and 44d to the weighing batch blender 40 one at a time when so directed by the site based computer 14.

The site based computer 14 identifies the customer when presented with a coded card through a card reader 21, and identifies the customers blend. The customer enters the quantity to be dispensed through the keyboard of the site based computer 14 and the site based computer 14 calculates the weight of each standard fertilizer ingredient required for the amount of blended fertilizer entered by the customer. The customer must then activate the dead man switch 46, by pressing and holding a button, by standing on a plate, or similar means. If the customer releases the dead man switch 46, the blending and dispensing apparatus will not operate.

The site based computer 14 then operates the transfer conveyors 42, one at a time, to convey the correct individual weight of each standard fertilizer to the weighing batch blender 40. Each transfer conveyor 42 operates until the proper weight for the ingredient being transferred is read by the site based computer 14. This process continues until the correct weight of each standard fertilizer ingredient is in the weighing batch blender 40, at which time the site based computer 14 operates the weighing batch blender 40 for a suitable time to blend the standard fertilizer ingredients into the blended fertilizer. The site based computer 14 then operates the dispensing conveyor 41 to dispense the blended fertilizer into the customer's truck 43.

The site based computer 14 then stores the quantity of blended fertilizer dispensed to the customer in the database 18 where it may be used for billing and so forth.

As an example, to achieve the 15.55-15.55-15.55-7.75 blend discussed earlier, the following amounts of the standard fertilizers will be transferred one at a time into the weighing batch blender 40, and be blended to make up a batch of 1000 pounds of the blended fertilizer:

|  |  | N | P | K | S |
|---|---|---|---|---|---|
| 11-52-0 | 299 pounds | 32.89 | 155.48 | 0 | 0 |
| 46-0-0 | 119 pounds | 54.74 | 0 | 0 | 0 |
| 0-0-60 | 259 pounds | 0 | 0 | 155.4 | 0 |
| 21-0-0-24 | 323 pounds | 67.83 | 0 | 0 | 77.52 |
|  | 1000 pounds | 155.46 | 155.48 | 155.48 | 77.52 |

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A method of dispensing blended fertilizer to a customer at a dispensing site, said blended fertilizer blended from a plurality of standard fertilizer ingredients by a blending and dispensing apparatus, said method comprising the following steps:

entering the blend of standard fertilizer ingredients required to provide said customer's desired nutrients into a database identified with said customer, wherein said database is readable by a dispensing site based computer;

providing an identifier to a customer, said identifier recognizable by said site based computer;

presenting said identifier to said site based computer and entering into said site based computer the desired quantity of blended fertilizer to be dispensed;

said site based computer then operating said blending and dispensing apparatus to dispense the desired quantity of blended fertilizer to the customer in accordance with said customer's desired fertilizer blend stored in the database.

2. The invention of claim 1 further comprising the step of said customer activating a dead-man switch before said site based computer will operate said blending and dispensing apparatus.

3. The invention of claim 1 further comprising storing the quantity of blended fertilizer delivered to a customer in said database.

4. The invention of claim 1 wherein said customer desires a plurality of different blended fertilizers and wherein each blend desired is entered into said database identified with said customer, and including the step of entering into said site based computer an indicator of which blended fertilizer is to be dispensed.

5. The invention of claim 1 wherein said dispensing site is an un-manned dispensing site.

6. A method of dispensing liquid blended fertilizer to a customer's tank at a dispensing site, said liquid blended fertilizer dispensed from a plurality of standard fertilizer ingredients by a dispensing apparatus, said method comprising the following steps:

entering the blend of standard liquid fertilizer ingredients required to provide said customer's desired blended fertilizer into a database identified with said customer, wherein said database is readable by a dispensing site based computer;

providing an identifier to a customer, said identifier recognizable by said site based computer;

presenting said identifier to said site based computer and entering into said site based computer the desired quantity of blended liquid fertilizer to be dispensed;

said site based computer then calculating the quantity of each liquid standard fertilizer ingredient required in the selected quantity of blended liquid fertilizer and then operating said dispensing apparatus to dispense the required amount of each liquid standard fertilizer ingredient into a tank one ingredient at a time.

7. The invention of claim 6 wherein said dispensing apparatus comprises a pump, at least one valve, and at least one meter readable by said site based computer to indicate the quantity of each liquid standard fertilizer ingredient dispensed.

8. The invention of claim 6 further comprising the step of said customer activating a dead-man switch before said site based computer will operate said dispensing apparatus.

9. The invention of claim 6 further comprising the step of storing the quantity of blended liquid fertilizer delivered to a customer in said database.

10. The invention of claim 6 wherein said customer desires a plurality of different liquid blended fertilizers and wherein each blend desired is entered into said database identified with said customer, and including the step of entering into said site based computer an indicator of which liquid blended fertilizer is to be dispensed.

11. The invention of claim 6 further comprising printing a report of the quantity and blend of fertilizer dispensed.

12. The invention of claim 10 wherein the quantity of blended fertilizer to be applied per acre is printed on said report.

13. The invention of claim 5 wherein said dispensing site is an un-manned dispensing site.

* * * * *

UNITED STATES PATENT AND TRADEMARK OFFICE
CERTIFICATE OF CORRECTION

PATENT NO.   : 6,351,687 B1
DATED        : February 26, 2002
INVENTOR(S)  : Douglas Snider et al.

It is certified that error appears in the above-identified patent and that said Letters Patent is hereby corrected as shown below:

The Title page should be deleted and substitute therefore the attached title page.

<u>Drawings,</u>
Delete Drawing sheets, consisting of Figs. 1-4, and substitute therefore the Drawing Sheets, consisting of Figs. 1-3 as shown on the attached pages.

Signed and Sealed this

Twenty-sixth Day of August, 2003

JAMES E. ROGAN
*Director of the United States Patent and Trademark Office*

(12) United States Patent
Snider et al.

(10) Patent No.: US 6,351,687 B1
(45) Date of Patent: Feb. 26, 2002

(54) FERTILIZER DISPENSING METHOD (75) Inventors: Douglas Snider; William Robb, both of Tisdale (CA)

(73) Assignee: Northern Steel Industries, Tisdale (CA)

( * ) Notice: Subject to any disclaimer, the term of this patent is extended or adjusted under 35 U.S.C. 154(b) by 0 days.

(21) Appl. No.: 09/476,827

(22) Filed: Jan. 3, 2000

(30) Foreign Application Priority Data

May 19, 1999 (CA) ............................................. 2272444

(51) Int. Cl.[7] .............................................. G06F 17/00
(52) U.S. Cl. ....................... 700/239; 700/239; 700/241; 700/265; 141/104; 141/105; 222/14; 222/136; 137/606
(58) Field of Search .................................. 700/237, 232, 700/233, 236, 239, 240, 241, 242, 265, 285; 222/14, 136; 141/100, 104, 105, 106, 107; 137/606, 101.21

(56) References Cited

U.S. PATENT DOCUMENTS

| | | | |
|---|---|---|---|
| 3,959,636 A | * 5/1976 | Johnson et al. | 235/151.33 |
| 4,527,245 A | 7/1985 | Axelson, Jr. et al. | |
| 4,719,574 A | * 1/1988 | Duback et al. | 364/468 |
| 5,154,314 A | * 10/1992 | Van Wormer | 222/1 |
| 5,967,202 A | * 10/1999 | Mullen et al. | 141/104 |

* cited by examiner

*Primary Examiner*—Christopher P. Ellis
*Assistant Examiner*—Khoi H. Tran
(74) *Attorney, Agent, or Firm*—Oppenheimer Wolff & Donnelly LLP (57) ABSTRACT

A method for dispensing blended fertilizer to a customer at a dispensing site, which may be remote and unmanned. The fertilizer dealer enters the blend of standard fertilizer ingredients required to provide the customer's desired nutrients into a database identified with the customer. The customer identifies himself to a dispensing site based computer which recognizes the blend and operates a blending and dispensing apparatus to dispense the desired quantity of blended fertilizer to the customer. A plurality of blends may be available to the customer.

13 Claims, 4 Drawing Sheets